Jan. 23, 1934.  S. B. WINN  1,944,775
FIFTH WHEEL COUPLING FOR TRACTOR-TRAILER COMBINATIONS
Filed July 27, 1932   4 Sheets-Sheet 1
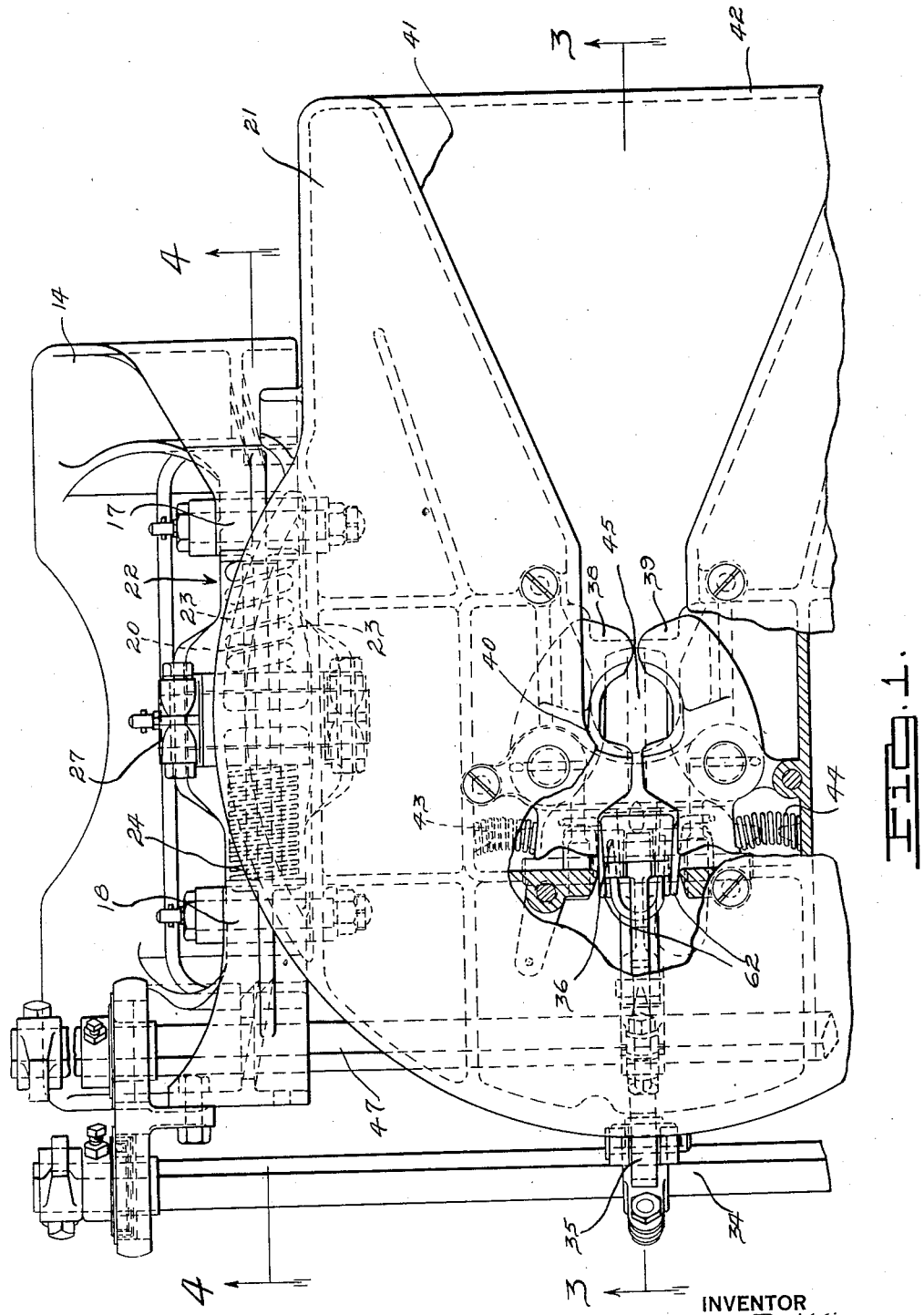
INVENTOR
Sidney B. Winn.
BY Wood & Wood
ATTORNEYS Jan. 23, 1934.                S. B. WINN                    1,944,775
        FIFTH WHEEL COUPLING FOR TRACTOR-TRAILER COMBINATIONS
                Filed July 27, 1932       4 Sheets-Sheet 2
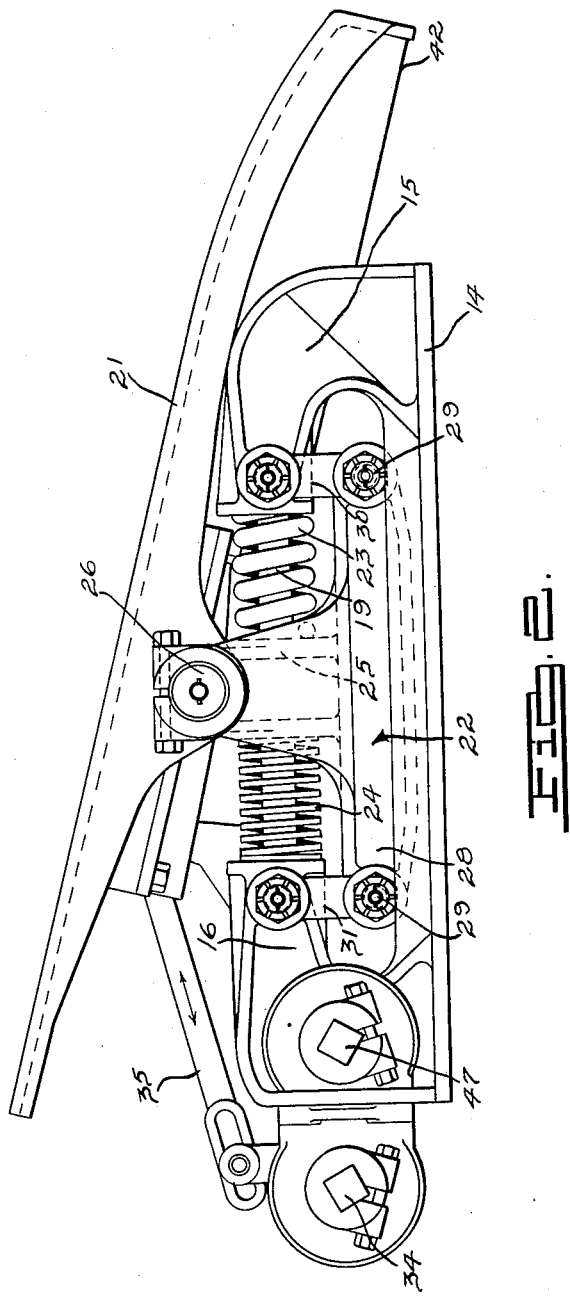
                                                    INVENTOR
                                                 Sidney B. Winn.
                                              BY Wood & Wood
                                                    ATTORNEYS Jan. 23, 1934.  S. B. WINN  1,944,775
FIFTH WHEEL COUPLING FOR TRACTOR-TRAILER COMBINATIONS
Filed July 27, 1932  4 Sheets-Sheet 3
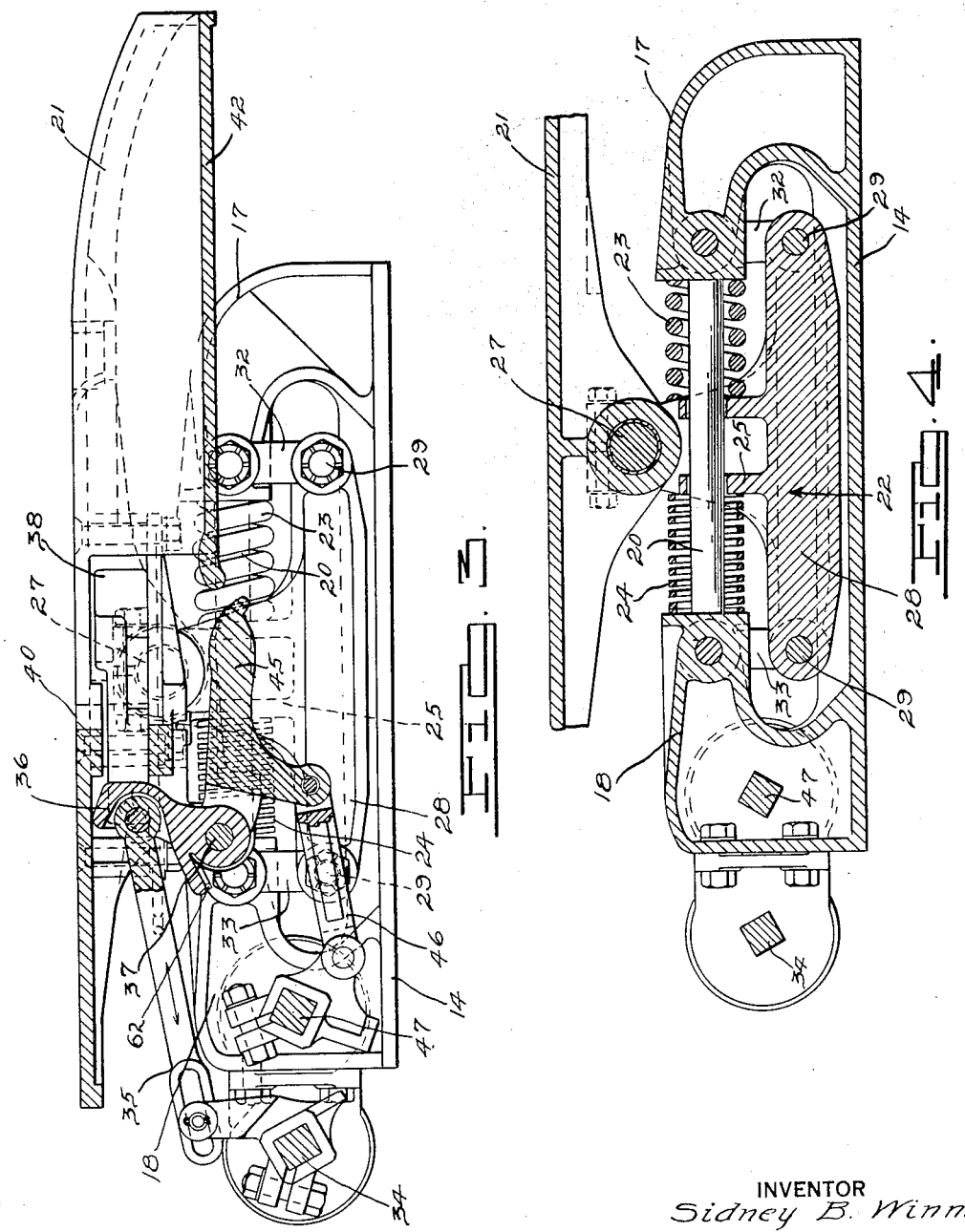
INVENTOR
Sidney B. Winn.
BY
ATTORNEYS Jan. 23, 1934.  S. B. WINN  1,944,775
FIFTH WHEEL COUPLING FOR TRACTOR-TRAILER COMBINATIONS
Filed July 27, 1932  4 Sheets-Sheet 4
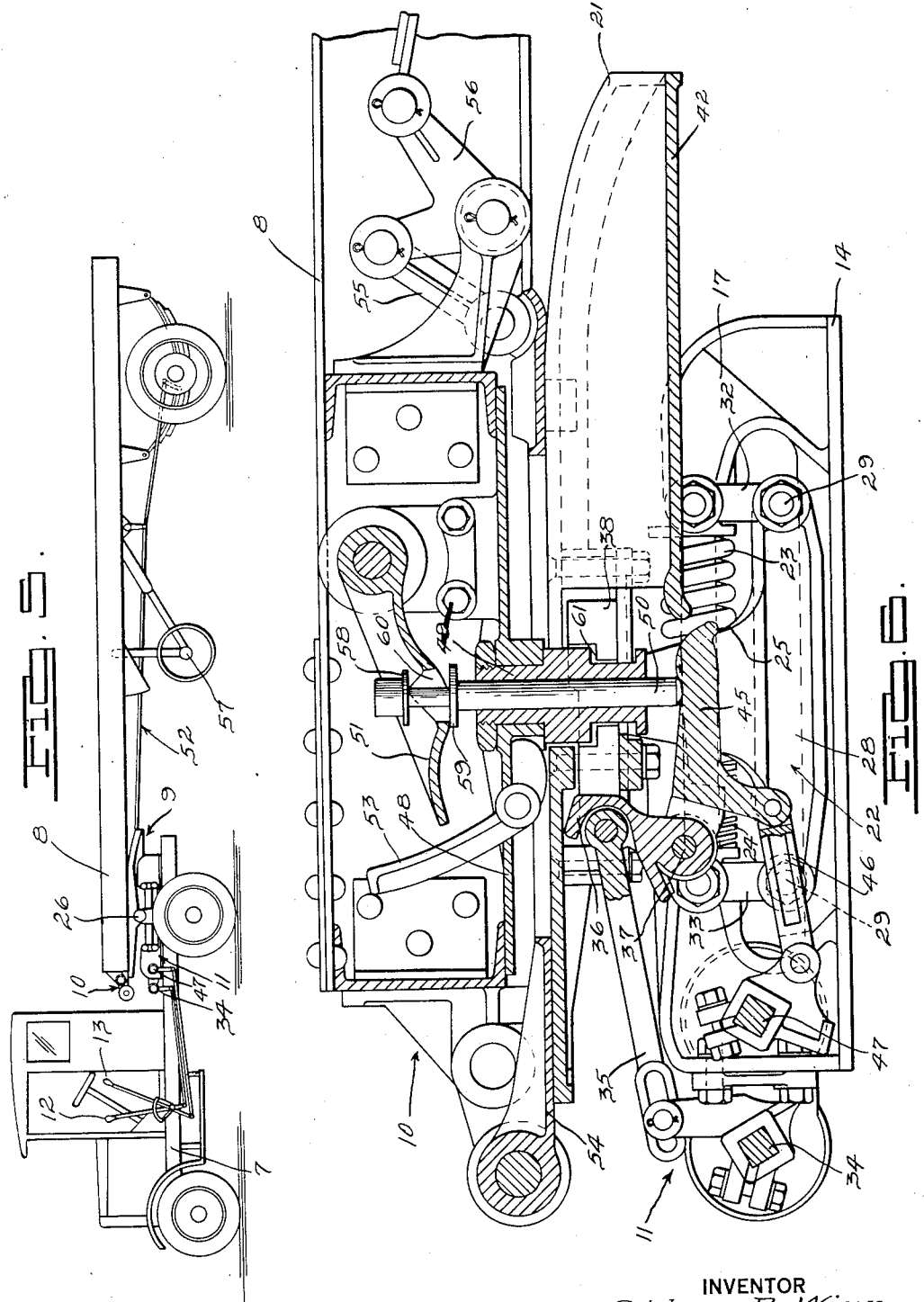
INVENTOR
Sidney B. Winn.
BY Wood & Wood
ATTORNEYS Patented Jan. 23, 1934

1,944,775

UNITED STATES PATENT OFFICE 1,944,775

FIFTH WHEEL COUPLING FOR TRACTOR-TRAILER COMBINATIONS

Sidney B. Winn, Lapeer, Mich.

Application July 27, 1932. Serial No. 625,015

3 Claims. (Cl. 280—33.1)

My invention relates to a fifth wheel coupling for tractor-trailer combinations and particularly to a fifth wheel coupling for use in tractor-trailer combinations in which a king pin is carried by the trailer and the coupler is carried by the tractor.

Fifth wheel couplings of the rocking or oscillating type have heretofore been used in tractor-trailer combinations, but have not been wholly satisfactory under all operating conditions. This has been due to some extent to the failure to provide positive automatic couplings and means for operating the trailer brakes which may be automatically applied upon the overriding of the tractor by the trailer. In this type of tractor-trailer combination considerable difficulty also has been experienced in the breaking off or misplacing of the trailer brake operating pins during the coupling of the vehicles.

In fifth wheel couplings of a freely oscillating type, there is considerable difficulty experienced in holding the component parts of the assembly during the coupling and uncoupling of the tractor-trailer vehicles so as to permit the coupling and uncoupling to be accomplished with a minimum amount of confusion. Also during operation of the vehicles in the coupled position such couplings permit an excess amount of relative movement between the vehicles which accelerates the wear on the parts of the coupling.

In fifth wheel couplings of a rocking type there frequently is no provision for the slight relative longitudinal movement which should be permitted between the tractor and trailer when coupled in order to provide for automatic application of the brakes on the trailer upon overriding of the tractor.

It is an object of my present invention to provide a fifth wheel coupling for tractor-trailer combinations in which a slight relative longitudinal movement between the coupled vehicles is permitted without causing excess wear on the parts of the fifth wheel coupling member.

It is a further object of my present invention to provide a fifth wheel coupling for tractor-trailer combinations having an automatic coupling means carried by the tractor which provides positive locking of the tractor and trailer when coupled.

It is another object of my invention to provide a fifth wheel coupling for tractor-trailer combinations in which the brakes on the trailer may be automatically applied upon the overriding of the tractor by the trailer.

It is a further object of my invention to provide a fifth wheel coupling for tractor-trailer combinations wherein the brake pin carried on the trailer is raised and positively guided to the brake operating means incorporated in the tractor portion of the fifth wheel coupling.

These, and various other objects, features of arrangement, construction and operation, are plainly shown and described and will be best understood by reference to the accompanying drawings wherein I have shown a preferred embodiment of my invention, in which:

Fig. 1 is a fragmentary top plan view showing the lower or tractor half of the fifth wheel with the coupler jaws closed;

Fig. 2 is a plan view in side elevation showing the lower or tractor half of the fifth wheel in the position for coupling the tractor and trailer;

Fig. 3 is a view in side elevation partially in cross section, taken on the line 3—3 of Fig. 1;

Fig. 4 is a cross sectional view in side elevation taken on the line 4—4 of Fig. 1;

Fig. 5 is a plan view in side elevation of a tractor and trailer coupled by a fifth wheel coupling embodying my invention;

Fig. 6 is a fragmentary sectional view in side elevation of a complete fifth wheel coupling embodying my invention.

Similar reference numerals refer to similar parts throughout the several views.

Referring more in detail to the drawings, a tractor vehicle 7 and a trailer vehicle 8 (Fig. 5) are coupled together for operation as a unit by a fifth wheel coupling member 9, which consists of an upper portion 10 carried by the trailer 8 and a lower portion 11 carried by the tractor 7. A coupling and uncoupling lever 12 is mounted in the cab of the tractor 7 and is operatively connected with the coupling mechanism contained in the lower portion 11 of the fifth wheel coupling 9 carried by the tractor 7. A brake setting lever 13 is likewise mounted in the cab of the tractor vehicle and is operatively connected with a trailer brake operating mechanism contained in the lower portion 11 of the fifth wheel coupling 9.

As shown in Fig. 2, the lower or tractor portion 11 of the fifth wheel coupling 9 consists of a base member 14 secured to the tractor vehicle 7 and is formed with opposed overhanging arms 15 and 16 on one side of the base member 14, and opposed overhanging arms 17 and 18 on the opposite side of the base member 14 (Fig. 1). The opposed overhanging arms 15 and 16 carry a rod 19, and the opposed overhanging arms 17 and 18 carry a rod 20.

A top plate 21 is pivotally secured to a supporting member 22, which is slidably mounted on the rods 19 and 20 between draft springs 23 and cushion springs 24. The supporting member 22 has a central upright portion 25 carrying the pivotal connections 26 and 27 for attachment with the top plate 21. The central upright portion 25 is integral with a base portion 28 having four points of pivotal contact 29. A support for the top plate 21 and the supporting member 22 is provided by the rods 19 and 20 and shackles 30, 31, 32 and 33 connecting the overhanging arms 15, 16, 17 and 18 of the base portion 14 with the four points of pivotal connection 29 on the base portion 28 of the member 22.

As shown in Fig. 2, the top plate 21 pivots about the pivotal connections 26 and 27 when the vehicles are uncoupled and assumes the position of an upwardly inclined wedge which may be backed under the forward end of the trailer 8.

The coupling lever 12 is connected with a cross shaft 34 to which is operatively connected a lever 35 which transmits motion from said cross shaft 34 to the coupler lock 36 (Fig. 3). Coil springs 62 engage with a coupler lock 36 and tend to hold it in engagement with the coupler jaws 38 and 39. The spring 63 is permitted to pivot about the cross rod 37 and move forwardly and away from the trailer vehicle, thus causing a release of the pivoted coupler jaws 38 and 39 (Fig. 1) which are secured to the top plate 21 of the lower portion 11 of the fifth wheel coupling 9. The springs 62 cause the coupler lock 36 to remain in a position to lock the coupler jaws 38 and 39 at all times except when pulled to a released position by the lever 12 and the associated mechanism.

The top plate 21 is provided with a central opening 40 and cut-away guiding jaws 41 leading from the central opening 40 to the lower edge of the top plate 21 when in the position shown in Fig. 2. A plate 42 covers the bottom of the cut-away guiding jaws 41.

The pivoted coupler jaws 38 and 39 have a portion extending beyond the points of pivotal connection with the top plate 21 and abut against springs 43 and 44 (Fig. 1), which tend to hold the pivoted coupler jaws 38 and 39 in an open position. The extending portions of the pivoted coupler jaws 38 and 39 also are so formed as to contact with the coupler locking member 36, which acts to prevent the springs 43 and 44 from opening the jaws 38 and 39 except when the locking member 36 is withdrawn by movement of the coupling and uncoupling lever 12 transmitted through the cross shaft 34 and the lever 35.

Adjacent the top plate 21 and directly beneath the central opening 40 is a trailer brake operating finger 45 pivotally mounted on the cross rod 37 and operatively connected with a lever 46, which is operatively connected with a brake operating cross shaft 47, which in turn is operatively connected to the brake operating lever 13 in the cab of the tractor 7.

The upper or trailer half 10 of the fifth wheel coupling 9 comprises a plate 48 (Fig. 6) secured to the frame of the trailer vehicle 8. A depending king pin 49 is secured to the plate 48 and is hollow in the center to permit a trailer brake operating pin 50 to pass through it. The brake operating pin 50 contacts with a pivoted lever 51, which is operatively connected with the trailer brake operating mechanism 52 (Fig. 5). A pivoted lock 53 is provided adjacent said pivoted lever 51 and is adapted to contact with the underside of said pivoted lever 51 when it is in the raised or brake applying position and so lock the brakes on the trailer 8 during the time that it is uncoupled from the tractor 7.

In one embodiment of my invention a pivoted plate 54 is provided adjacent the lower face of the plate 48 and acts through a lever 55 and bell crank 56 to raise and lower the trailer supporting means 57 (Fig. 5), as is more fully described and set forth in my co-pending application for United States Letters Patent Serial No. 625,013, filed July 27, 1932.

The trailer brake operating pin 50 is held in place in the king pin 49 by means of collars 58 and 59, which extend above and below an opening 60 in the pivoted lever 51. The depending king pin 49 is provided with a circumferential groove 61 adjacent its lower end. The coupler jaws 38 and 39 contained in the lower or tractor half 11 of the fifth wheel coupling 9 engage with the grove 61 on the king pin 49 when the tractor and trailer are in the coupled position.

The operation of my invention is as follows: When the tractor 7 and the trailer 8 are uncoupled the top plate 21 of the lower or tractor portion 11 of the fifth wheel coupling pivots about the pivot points 26 and 27 and assumes the position shown in Fig. 2. At this time the coupler jaws 38 and 39, pressed by the springs 43 and 44 (Fig. 1), are open and the coupler locking member 36 is held out of engagement with the jaws 38 and 39 by the lever 12 and associated mechanism. The trailer brake lever 51 is held in position to hold the trailer brakes in the applied position by the lock 53.

When the tractor 7 is backed under the forward end of the trailer 8, the cut-away guiding jaws 41 of the top plate 21 engage the depending king pin 49 on the trailer 8 and guide it to the central opening 40 directly above the coupler jaws 38 and 39. The plate 42 on the bottom of the top plate 21 acts to raise the trailer brake pin 50 and hold it in the proper position to contact with the top surface of the brake operating finger 45. The plate 42 also prevents a misplacement or breaking of the trailer brake pin 50 during the coupling operation. As the tractor 7 continues to back under the trailer 8 and the weight of the trailer 8 passes the pivot points 26 and 27, the top plate 21 is caused to pivot about these points and assume the position shown in Fig. 6.

When the tractor and trailer have assumed the position shown in Fig. 5, the parts of the fifth wheel coupling 9 are in the position shown in Fig. 6. As there shown, the top plate 21 has assumed a substantially horizontal position and the weight of the forward end of the trailer 8 and its load is borne by the tractor 7 through the fifth wheel coupling 9, this weight being transmitted to the top plate 21 of the fifth wheel coupling 9 and through it to the upright supporting member 22 mounted on the rods 19 and 20 and the shackles 30, 31, 32 and 33. The rods 19 and 20 and the shackles 30, 31, 32 and 33. transmit the weight imposed thereon to the overhanging arms 15, 16, 17 and 18 of the base member 14 secured to the tractor vehicle 7.

When the king pin 49, guided by the cut-away guiding jaws 41 in the top plate 21, reaches the central opening 40, it contacts with heels formed on the pivoted coupler jaws 38 and 39 and cause the said coupler jaws to pivot about their pivot points and surround the king pin 49 and engage with the circumferential groove 61 of the said king pin 49. The coupler lock 36 then is caused to assume the position between the jaws 38 and 39 as shown in Fig. 6, and the release of the spring 62 by manipulation of the lever 12 and the associated mechanism causes the coupler lock 36 to assume the position between the coupler jaws 38 and 39, which locks the coupler jaws around the king pin 49 and prevents uncoupling of the vehicles until swung out of engagement with the jaws 38 and 39 by operation of the coupling and uncoupling lever 12. The jaws 38 and 39, when engaging the circumferential groove portion 61 of the king pin 49, prevent an accidental disengagement of the vehicles by a displacement of the king pin 49 in a vertical direction.

By reason of the mounting of the top plate 21 on the supporting member 22 and its being mounted in turn on the rods 19 and 20, slight relative longitudinal movement between the trailer 8 and the tractor 7 is permitted when the vehicles are in the coupled position, this relative movement taking place only between the supporting member 22 and the base member 14 when the supporting member 22 slides on the rods 19 and 20. The amount of sliding movement permitted, however, is limited by the shackles 30, 31, 32 and 33 and the draft springs 23 and the cushion springs 24.

This limited relative longitudinal movement between the vehicles thus permitted by my invention, permits the draft springs 23 to absorb the sudden strains incident to pulling the trailer 8 such as when starting the vehicles and the like, and also permits the cushion springs 24 to absorb the strains incident to the backing of the vehicles and when the trailer 8 tends to override the tractor 7.

When the vehicles are coupled and the parts of the coupling are in the position shown in Fig. 6, the brake operating finger 45 may be so held in a proper position that the overriding of the tractor 7 by the trailer 8 will cause the trailer brake pin 50 to move along the face of the brake operating finger 45 and cause an application of the brakes on the trailer 8 so as to retard its progress sufficiently to check the overriding of the tractor. Likewise, when the brake operating finger 45 is raised by manipulation of the brake lever 13, the brake pin 50 is so raised as to apply the brakes on the trailer 8. This is essential when it is desired to uncouple the vehicles as this movement may be used to set the brakes on the trailer and lock the brakes by movement of the lock member 53 under the brake lever 51. This permits the tractor 7 to be driven away from the trailer 8 and allows the vehicles to be uncoupled.

When it is desired to uncouple the vehicles, the brakes on the trailer 8 should first be set by proper manipulation of the brake lever 13. The coupling lock 36 then is withdrawn from between the coupling jaws 38 and 39 by being pulled forwardly from the position shown in Fig. 6 by movement of the lever 35 due to rotation of the cross shaft 34 by manipulation of the coupling and uncoupling lever 12.

From the foregoing it will be apparent that I have shown and described a fifth wheel coupling for tractor-trailer combinations which provides for a slight relative longitudinal movement between the vehicles when coupled without causing excess wear on the parts of the coupler, and which at the same time will provide for the automatic coupling and uncoupling of the vehicles and yet lock the vehicles positively and prevent accidental disengagement when in the coupled position. Provision also is made for the automatic application of the trailer brakes when the trailer overrides the tractor, and injury to the trailer brake operating pin during the coupling and uncoupling of the vehicles is largely eliminated, and provision is made to insure the positive alignment of the trailer brake operating pin with the trailer brake operating mechanism carried in the tractor portion of the fifth wheel coupling.

While I have illustrated and described one embodiment of my invention, it is apparent that various changes and modifications may be made without departing from the spirit of my invention, and I do not wish to be limited to the precise details of construction as herein set forth, but desire to avail myself of all changes within the scope of the appended claims.

Having thus described my invention, what I claim is new and desire to secure by Letters Patent of the United States, is:

1. In a tractor trailer combination in which the tractor includes a rear support portion and the trailer includes a forward portion adapted to be supported on the tractor; a base member mounted on the rear portion of the tractor, a fifth wheel supporting element, longitudinally disposed rods included as parts of the base member, said fifth wheel supporting member traversed by said rods, links flexibly supporting the ends of the supporting member on the frame, springs between the supporting member and the base member on the rods, a lower fifth wheel element horizontally pivoted on the supporting member, an upper fifth wheel element pivotally mounted on the forward end of the trailer, and means for coupling said tractor and trailer when the fifth wheels are superimposed.

2. In a tractor trailer combination, said tractor having a base member fixed on its rear end, a fifth wheel supporting element longitudinally slidably mounted on the base member, a lower fifth wheel pivotally mounted on said supporting member, said trailer having an upper fifth wheel pivotally mounted on its forward end co-acting with the lower fifth wheel, coupling jaws mounted in the lower base member, a king pin depending from the trailer and adapted to cooperate with said jaws, a brake pin disposed through said king pin, a lever pivotally mounted in the base member and engaging the lower end of the brake pin, trailer brake operating mechanism connected to the upper end of said brake pin, means for operating the lever, said lever mounted whereby its upper surface is disposed on an incline when the tractor and trailer are coupled and in running condition, whereby relative longitudinal movement of the coupled fifth wheels resulting from overriding of the trailer causes the brake pin to ride up the inclined surface of the rock lever and operate the trailer brakes.

3. In a tractor trailer combination, a base member mounted on the rear end of the tractor, a fifth wheel element pivotally mounted on said base member and including a longitudinally disposed depression centrally thereof, said trailer having a pivoted fifth wheel at its forward end and a depending king pin, a brake pin extended through said king pin, trailer brake operating mechanism extended from the upper end of the brake pin, a brake pin translating lever mounted in the base member, and operating mechanism extended to said lever, said lower fifth wheel and upper fifth wheel contacting on inclination in the primary stage of coupling, and said king pin and brake pin depending into and passing through the depression of the lower fifth wheel, said brake pin contacting the base of the depression and guided to position in contact with the top surface of the brake pin operating lever of the tractor.

SIDNEY B. WINN.